United States Patent
Andraszek et al.

(10) Patent No.: US 9,544,438 B1
(45) Date of Patent: Jan. 10, 2017

(54) COMPLIANCE MANAGEMENT OF RECORDED AUDIO USING SPEECH ANALYTICS

(71) Applicant: Noble Systems Corporation, Atlanta, GA (US)

(72) Inventors: Joseph Andraszek, Oklahoma City, OK (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 14/743,200

(22) Filed: Jun. 18, 2015

(51) Int. Cl.
*H04M 3/00* (2006.01)
*H04M 3/56* (2006.01)
(Continued)

(52) U.S. Cl.
CPC .............. *H04M 3/568* (2013.01); *G10L 25/51* (2013.01); *H04M 3/5183* (2013.01)

(58) Field of Classification Search
CPC .... H04M 3/51; H04M 3/5183; H04M 3/5191; H04M 7/0003; H04M 7/0006; H04M 7/006; H04M 3/5232; H04M 3/5307; H04M 3/42059; H04M 3/5125; H04M 3/5158; H04M 3/5233; H04M 3/42323; H04M 3/523; H04M 3/5237; H04M 7/0009; H04L 12/585; H04L 51/12; H04L 51/38; H04L 12/5895; H04L 63/1408; H04L 63/30; H04L 63/0861; H04L 9/32; G06F 19/322; G06F 19/324; G06F 21/32; G06F 21/552; G10L 15/26; G10L 17/00; G10L 2015/088; G10L 15/00; G10L 15/1822; G10L 17/005
(Continued)

(56) References Cited

U.S. PATENT DOCUMENTS 5,267,305 A 11/1993 Prohs et al.
5,270,920 A 12/1993 Pearse et al.
(Continued)

OTHER PUBLICATIONS

Office Action Received for U.S. Appl. No. 14/230,463 dated Jan. 14, 2016.
(Continued)

*Primary Examiner* — Md S Elahee
*Assistant Examiner* — Kharye Pope

(57) ABSTRACT

Various embodiments of the invention provide methods, systems, and computer-program products for identifying an occurrence during a conversation being conducted between a first party and a second party where sensitive information is conveyed by the first party or the second party. In particular embodiments, speech analytics is used to monitor audio of the conversation and a first speech characteristic is detected indicating a start event identifying a start of an occurrence where sensitive information is conveyed by the first party or the second party. Following the detection of first speech characteristic, a second speech characteristic is detected in the audio indicating an end event identifying an end of the occurrence. Accordingly, identifiers for the start and end events are then recorded in various embodiments as metadata along with a recording of the audio of the conversation to identify where in the recording the occurrence takes place.

9 Claims, 9 Drawing Sheets

(51) Int. Cl.
*H04M 3/51* (2006.01)
*G10L 25/51* (2013.01)
*H04M 1/64* (2006.01)
*G10L 15/00* (2013.01)

(58) Field of Classification Search
USPC .................. 379/265.09, 88.01, 142.05,
265.02,379/32.01; 370/352, 356, 351;
704/275, 231, 704/251, 257
See application file for complete search history.

(56) References Cited

U.S. PATENT DOCUMENTS

| | | | |
|---|---|---|---|
| 6,157,808 | A | 12/2000 | Hollingsworth et al. |
| 6,356,634 | B1 | 3/2002 | Noble, Jr. |
| 6,862,343 | B1* | 3/2005 | Rilantono ............ H04M 3/5166 379/266.1 |
| 7,133,828 | B2 | 11/2006 | Scarano et al. |
| 7,542,902 | B2 | 6/2009 | Scahill et al. |
| 7,548,539 | B2 | 6/2009 | Kouretas et al. |
| 7,574,000 | B2 | 8/2009 | Blair |
| 7,672,845 | B2 | 3/2010 | Beranek et al. |
| 7,752,043 | B2 | 7/2010 | Watson |
| 7,930,179 | B1 | 4/2011 | Gorin et al. |
| 7,974,411 | B2 | 7/2011 | Krishnapuram et al. |
| 8,078,470 | B2 | 12/2011 | Levanon |
| 8,094,790 | B2 | 1/2012 | Conway et al. |
| 8,094,803 | B2 | 1/2012 | Danson et al. |
| 8,155,297 | B1 | 4/2012 | Dhir et al. |
| 8,175,007 | B2 | 5/2012 | Jain et al. |
| 8,180,643 | B1 | 5/2012 | Pettay et al. |
| 8,204,180 | B1* | 6/2012 | Narayanan .......... G06F 21/6245 345/626 |
| 8,209,182 | B2 | 6/2012 | Narayanan |
| 8,219,401 | B1 | 7/2012 | Pettay et al. |
| 8,249,875 | B2 | 8/2012 | Levanon et al. |
| 8,275,115 | B1* | 9/2012 | Everingham ....... H04M 3/5166 379/265.01 |
| 8,396,205 | B1 | 3/2013 | Lowry et al. |
| 8,396,732 | B1 | 3/2013 | Nies et al. |
| 8,401,155 | B1 | 3/2013 | Barnes et al. |
| 8,422,641 | B2 | 4/2013 | Martin, II |
| 8,463,606 | B2 | 6/2013 | Scott et al. |
| 8,504,371 | B1 | 8/2013 | Vacek et al. |
| 8,531,501 | B2 | 9/2013 | Portman et al. |
| 8,649,499 | B1 | 2/2014 | Koster et al. |
| 8,761,376 | B2 | 6/2014 | Pande et al. |
| 8,767,948 | B1 | 7/2014 | Riahi et al. |
| 8,781,092 | B2 | 7/2014 | Noble, Jr. |
| 8,831,204 | B1 | 9/2014 | Pycko et al. |
| 8,949,128 | B2 | 2/2015 | Meyer et al. |
| 9,014,364 | B1 | 4/2015 | Koster et al. |
| 2003/0002651 | A1 | 1/2003 | Shires |
| 2003/0154120 | A1 | 8/2003 | Freishtat et al. |
| 2004/0008828 | A1 | 1/2004 | Coles et al. |
| 2004/0249650 | A1 | 12/2004 | Freedman et al. |
| 2005/0226395 | A1 | 10/2005 | Benco et al. |
| 2005/0283475 | A1 | 12/2005 | Beranek et al. |
| 2005/0286705 | A1 | 12/2005 | Contolini et al. |
| 2005/0286706 | A1 | 12/2005 | Fuller |
| 2006/0050658 | A1 | 3/2006 | Shaffer et al. |
| 2006/0111953 | A1 | 5/2006 | Setya |
| 2006/0233346 | A1 | 10/2006 | McIlwaine et al. |
| 2006/0256954 | A1 | 11/2006 | Patel et al. |
| 2006/0259473 | A1 | 11/2006 | Li et al. |
| 2006/0262919 | A1 | 11/2006 | Danson et al. |
| 2006/0265090 | A1 | 11/2006 | Conway et al. |
| 2007/0088563 | A1 | 4/2007 | Nardotti, Jr. et al. |
| 2007/0111180 | A1 | 5/2007 | Sperle et al. |
| 2007/0160054 | A1 | 7/2007 | Shaffer et al. |
| 2007/0198330 | A1 | 8/2007 | Korenblit et al. |
| 2007/0280211 | A1* | 12/2007 | Malueg ................ H04L 63/30 370/356 |
| 2007/0280460 | A1 | 12/2007 | Harris et al. |
| 2008/0002823 | A1 | 1/2008 | Fama et al. |
| 2008/0027785 | A1 | 1/2008 | Mechaley et al. |
| 2008/0037719 | A1* | 2/2008 | Doren ................ G10L 21/00 379/85 |
| 2008/0082330 | A1 | 4/2008 | Blair |
| 2008/0240376 | A1 | 10/2008 | Conway et al. |
| 2008/0270123 | A1 | 10/2008 | Levanon et al. |
| 2009/0157449 | A1 | 6/2009 | Itani et al. |
| 2009/0295536 | A1* | 12/2009 | Doren ................ G10L 21/00 340/5.52 |
| 2010/0036670 | A1 | 2/2010 | Hill et al. |
| 2010/0082342 | A1* | 4/2010 | Erhart ................ G10L 21/045 704/246 |
| 2010/0104086 | A1 | 4/2010 | Park |
| 2010/0138411 | A1 | 6/2010 | Judy et al. |
| 2010/0158237 | A1 | 6/2010 | McCormack et al. |
| 2010/0161990 | A1 | 6/2010 | Statham et al. |
| 2011/0010173 | A1 | 1/2011 | Scott et al. |
| 2011/0026688 | A1 | 2/2011 | Simpson |
| 2011/0033036 | A1 | 2/2011 | Edwards et al. |
| 2011/0125499 | A1 | 5/2011 | Griggs et al. |
| 2011/0145093 | A1 | 6/2011 | Paradise et al. |
| 2011/0202344 | A1 | 8/2011 | Meyer et al. |
| 2011/0218798 | A1 | 9/2011 | Gavalda |
| 2011/0228919 | A1 | 9/2011 | Tew et al. |
| 2011/0287748 | A1 | 11/2011 | Angel et al. |
| 2011/0307258 | A1 | 12/2011 | Liberman et al. |
| 2011/0317828 | A1* | 12/2011 | Corfield ............ H04M 3/51 379/265.02 |
| 2012/0045043 | A1* | 2/2012 | Timpson ............ H04M 3/493 379/88.04 |
| 2012/0140911 | A1 | 6/2012 | Johansen et al. |
| 2012/0263285 | A1* | 10/2012 | Rajakumar ............ G10L 17/00 379/189 |
| 2013/0003943 | A1 | 1/2013 | Munns et al. |
| 2013/0129069 | A1 | 5/2013 | Peterson |
| 2013/0246053 | A1 | 9/2013 | Scott et al. |
| 2013/0266127 | A1* | 10/2013 | Schachter ............ G10L 25/48 379/88.01 |
| 2014/0100848 | A1 | 4/2014 | Shaffer et al. |
| 2014/0140496 | A1 | 5/2014 | Ripa et al. |
| 2014/0140497 | A1 | 5/2014 | Ripa et al. |
| 2014/0163960 | A1 | 6/2014 | Dimitriadis et al. |
| 2014/0241519 | A1 | 8/2014 | Watson et al. |
| 2014/0257820 | A1 | 9/2014 | Laperdon et al. |
| 2014/0379525 | A1* | 12/2014 | Timem ................ G06F 21/32 705/26.41 |
| 2015/0281446 | A1* | 10/2015 | Milstein ............ H04M 3/493 379/88.01 |

OTHER PUBLICATIONS

Notice of Allowance Received for U.S. Appl. No. 14/445,501 dated Feb. 4, 2016.
Office Action Received for U.S. Appl. No. 14/073,083 dated Feb. 16, 2016.
Notice of Allowance Received for U.S. Appl. No. 14/875,130 dated Feb. 24, 2016.
Asterisk DTMF, Voip=Info.o—A Reference Guide to All Things VoIP, four pages, retrieved on Mar. 18, 2013 from www.voip-info.org/wiki/view/Asterosk+DTMF.
Notice of Allowance received for U.S. Appl. No. 13/861,102, mailed May 2, 2014.
Office Action Received for U.S. Appl. No. 14/186,404 dated Dec. 12, 2014.
Office Action Received for U.S. Appl. No. 14/230,328 dated Nov. 28, 2014.
Schulzrinne, H; Petrack, S; Request for Comments 2833 ("RFC 2833"), RTP Payload for DTMF Digits, Telephony Tone, and Telephony Signals May 2000, 29 pages, The Internet Society, U.S.
Donovan, S; Request for Comments 2976 ("RFC 2976"), The SIP INFO Method; The Internet Society, Oct. 2000, 9 pages, U.S.
Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.
Schulzerinne, H; Taylor, T; Request for Comments 4733 ("RFC 4733"), RTP Payload for DTMF Digits, Telephony Tones, and Telephony Signals, The IETF Trust, Dec. 2006, 46 pages, U.S.

(56) References Cited

OTHER PUBLICATIONS

Homberg, C; Burger, E; Kaplan, H.; Request for Comments 6086 ("RFC 6086"), Session Initiation Protocol (SIP) INFO Method and Package Framework, Internet Engineering Task Force, Jan. 2011, 36 pages, U.S.

Kuthan, Jiri; Sisalem, Dorgham; SIP: More Than You Ever Wanted to Know About; Powerpoint Presentation, Mar. 2007, 242 pages, Tekelec, U.S.

Three Steps for Attacking Adherence Problems, Reynolds, Penny, Contact Center Association, Jan. 24, 2012.

Office Action Received for U.S. Appl. No. 13/949,467 dated Feb. 6, 2015.

Notice of Allowance Received for U.S. Appl. No. 14/230,328 dated Feb. 6, 2015.

Office Action Receivied for U.S. Appl. No. 14/186,404 dated May 8, 2015.

U.S. Appl. No. 61/753,641, filed Jan. 17, 2013.

Office Action Received for U.S. Appl. No. 13/968,692 dated Jun. 11, 2015.

Office Action Received for U.S. Appl. No. 14/230,463 dated Jun. 19, 2015.

Notice of Allowance Received for U.S. Appl. No. 13/949,467 dated Jul. 17, 2015.

Notice of Allowance Received for U.S. Appl. No. 14/186,404 dated Sep. 1, 2015.

Office Action Received for U.S. Appl. No. 14/230,463 dated Oct. 1, 2015.

Office Action Received for U.S. Appl. No. 14/661,676 dated Sep. 21, 2015.

Office Action Received for U.S. Appl. No. 14/445,501 dated Nov. 24, 2015.

Office Action Received for U.S. Appl. No. 13/968,692 dated Nov. 30, 2015.

Office Action Received for U.S. Appl. No. 14/875,130 dated Dec. 1, 2015.

Notice of Allowance Received for U.S. Appl. No. 14/661,676 dated Nov. 20, 2015.

Office Action Received for U.S. Appl. No. 14/172,993 dated Dec. 18, 2015.

Office Action Received for U.S. Appl. No. 14/230,463 dated Mar. 30, 2016.

Office Action Received for U.S. Appl. No. 14/080,912 dated Apr. 8, 2016.

Notice of Allowance Received for U.S. Appl. No. 14/073,083 dated May 25, 2016.

Notice of Allowance Received for U.S. Appl. No. 15/081,358 dated Jul. 27, 2016.

Office Action Received for U.S. Appl. No. 14/080,912 dated Sep. 23, 2016.

Office Action Received for U.S. Appl. No. 15/051,930 dated Nov. 10, 2016.

Office Action Received for U.S. Appl. No. 14/183,083 dated Oct. 7, 2016.

\* cited by examiner

COMPLIANCE MANAGEMENT OF RECORDED AUDIO USING SPEECH ANALYTICS

CROSS REFERENCE TO RELATED PATENT APPLICATIONS

This application is related to U.S. patent application Ser. No. 14/080,912, entitled "Architecture for Processing Real Time Event Notifications from a Speech Analytics System," filed on Nov. 15, 2013, a continuation-in-part of U.S. patent application Ser. No. 14/073,083 entitled "Configuring Contact Center Components for Real Time Speech Analytics," filed on Nov. 6, 2013, and is further related to U.S. patent application Ser. No. 14/230,328 entitled "Contact Center Speech Analytics System Having Multiple Speech Analytics Engines," filed on Mar. 31, 2014, in which the contents of each are incorporated by reference for all that they teach.

BACKGROUND

Contact centers frequently encounter calls being conducted between parties and agents of the contact centers in which situations arise where the parties and/or the agents provide sensitive information. "Sensitive information" is understood to be any type of information that may be desired to be limited in its exposure. For example, a party may call the contact center to purchase a product and during the call, the party may provide his credit card number to pay for the product. In this example, the credit card number is considered to be sensitive information. In many instances, calls involving the disclosure of sensitive information may be recorded for a number of various reasons and contact centers may be required to comply with governmental regulations, industry standards, and/or corporate policies that prohibit the storing of sensitive information using unsecure methods and/or unlimited access controls. Therefore, the contact centers may wish to "cleanse" any recordings having sensitive information.

Today, many contact centers rely on scripted or previously-structured workflows to attempt to identify occurrences where sensitive information is likely discussed and then halt recording during these occurrences so that the sensitive information is not recorded. However, using this type of approach for "cleansing" recordings of sensitive information is only effective if the sensitive information falls within a structured pattern and/or workflow. Therefore, any deviation from a script or workflow that results in an occurrence where sensitive information is conveyed outside of a structured pattern and/or workflow is likely to be missed. Therefore, a need exists in the industry for identifying occurrences where sensitive information is conveyed in an "unstructured" manner to avoid accidental storage of sensitive information that was conveyed outside of a structured pattern and/or workflow. Accordingly, it is with respect to this consideration and others that the disclosure herein is presented.

BRIEF SUMMARY

In general, embodiments of the present invention provide computer-program products, methods, systems, apparatus, and computing entities for identifying an occurrence during a conversation being conducted between a first party and a second party where sensitive information is conveyed by at least one of the first party and the second party. Specifically, speech analytics is used in various embodiments to monitor audio of the conversation and a first speech characteristic is detected in the audio indicating a start event identifying a start of an occurrence where sensitive information is conveyed by at least one of the first party and the second party. For example, the conversation may be a telephone call being conducted between an agent at a contact center and a remote party in which the remote party is providing the agent with sensitive information such as a credit card or social security number. Therefore, in this example, the start event identifies when the remote party starts to provide the agent with the credit card or social security number. Further, in particular embodiments, the indication of the start event is based on a confidence score associated with detecting the first speech characteristic being greater than a threshold value.

Accordingly, following the detection of the first speech characteristic indicating the start event, a second speech characteristic is detected in the audio indicating an end event identifying an end of the occurrence. For instance, returning to the example, the end event identifies when the remote party has finished providing the agent with the credit card or social security number. At that point, a first identifier for the start event and a second identifier for the end event are recorded in various embodiments as metadata along with a recording of the audio of the conversation to identify where in the recording the occurrence takes place.

As a result, the first identifier and the second identifier can then be read in various embodiments from the metadata and used to advance the recording to the start event based on the first identifier and apply a mask to the recording of the audio from the start event to the end event based on the second identifier. Accordingly, the mask hides the sensitive information conveyed during the occurrence so that an individual listening to the recording of the audio is unable to comprehend the sensitive information. That is to say in the example, an individual listening to the recording of the telephone call between the agent and the remote party is unable to hear the credit card or social security number provided by the remote party to the agent. In other embodiments, after advancing to the start event, a portion of the recording may instead be removed from the start event to the end event based on the second identifier and encrypted. While in other embodiments, the recording of the audio may be played for an individual up to the start event, the mask may then be applied from the start event to the end event so that the individual cannot comprehend the sensitive information, and then the remainder of the recording be played for the individual from the end event to the end of the recording.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
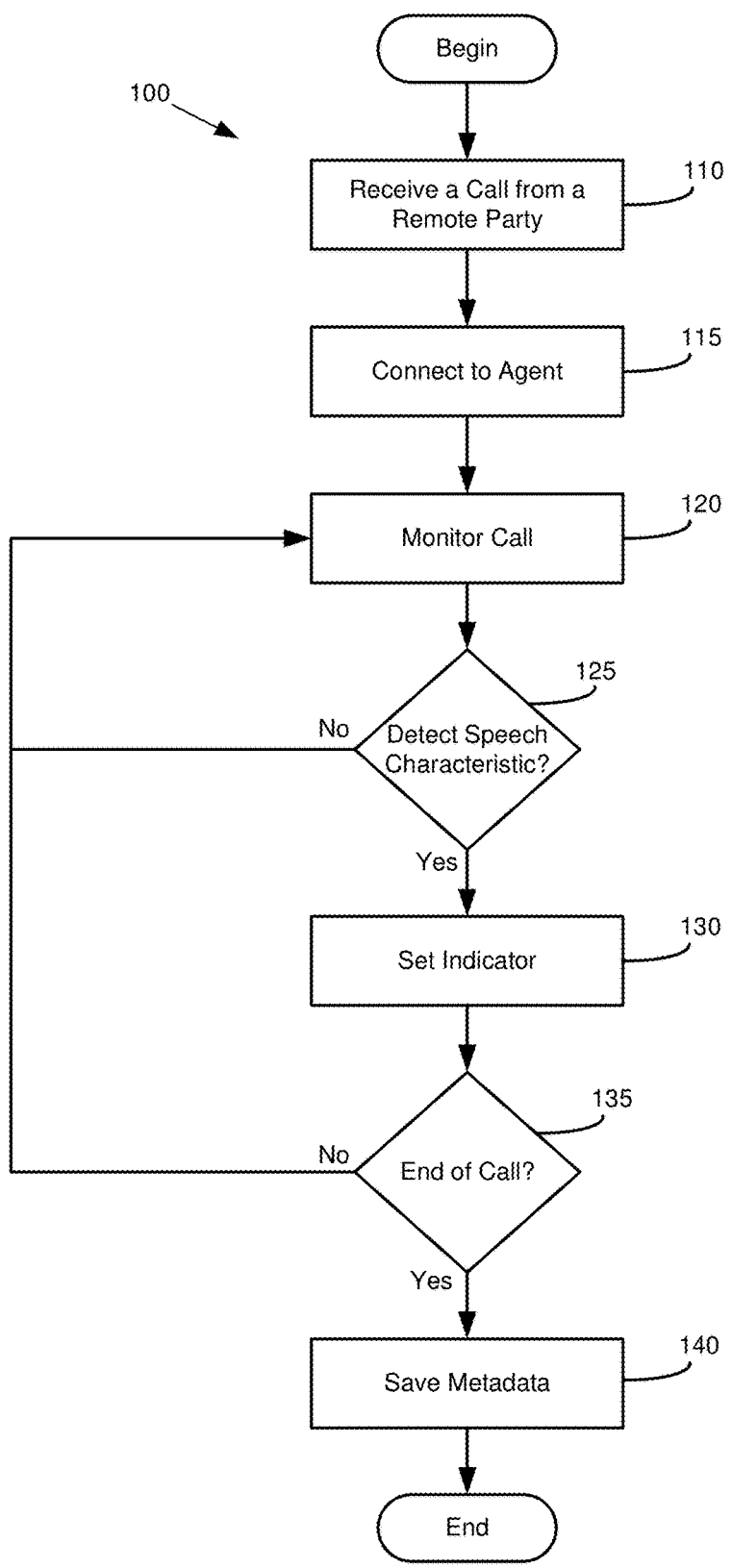
FIG. 1 illustrates an embodiment of a general process flow for practicing the various technologies and concepts disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

In addition, it is noted that for purposes of describing the invention and for simplicity, the remainder of the application will focus on describing the invention in the context of telephone calls being conducted between remote parties and agents in a contact center. However, one should appreciate that the various teachings and concepts described herein are contemplated to be applied to other uses outside the context of telephone calls being conducted between remote parties and agents in a contact center. For instance, the teachings and concepts can be used in analyzing recorded audio involving other situations where sensitive information may be provided such as, for example, conversations involving doctors and patients, conversations involving lawyers and clients, conversations involving government employees and private parties, and/or instances in which a single party is providing responses to an automated system such as an interactive voice response system. Therefore, describing the invention in the context of telephone calls conducted between remote parties and agents should not be construed to limit the scope of the invention. That is say, as one of ordinary skill in the art will appreciate from reading this disclosure, the teachings and concepts described herein can be applied to many different industries and situations, and not just contact centers and telephone calls.

With that said, additional information regarding the operation of a contact center with respect to a speech analytics system is provided in the disclosures of the above-mentioned patent applications. This information describes various components that may be present in a contact center, how event notifications from the speech analytics system are generally processed, and how application specific modules may process event notifications for specific calls to implement specific capabilities or applications. The description of the overall framework is not repeated herein, but incorporated by reference to provide supporting disclosure with respect to using the speech analytics system for identifying and tagging occurrences in a telephone call involving a remote party and a contact center agent where sensitive information is provided by the remote party and/or the agent.

Further, it is noted that the description of the overall framework involves identifying such occurrences in real-time as the telephone call is taking place between the remote party and the contact center agent. However, the teachings and concepts described herein can also be used in a context in which the occurrences are not identified in real-time. For example, in particular embodiments, recordings of telephone calls can be batched together after the calls have been completed and analyzed to identify occurrences where sensitive information is provided by the remote party and/or the contact center agent or the recordings may simply be processed once the recordings become available after completion of the calls.

Furthermore, although the examples provided herein illustrate the concepts in which a contact center is receiving calls placed by calling parties, the concepts can apply to other types of calls such as, for instance, outgoing calls placed by the contact center to called parties. Accordingly, voice calls (or simply "calls") are directed to the contact center from a remote party. The term "remote party" refers to the party interacting with the contact center. The purpose of the call may be placed for any number of different reasons. For instance, a remote party may be calling the contact center to make a purchase and/or to inquire about information the remote party is interested in receiving. In many instances, the contact center employs a plurality of agents to "field" these incoming calls.

Once a remote party has been connected with an agent at the contact center, the use of a speech analytics system ("SAS") in various embodiments of the invention allows the contact center to monitor the remote party and/or the agent so that the contact center can determine if a situation occurs in which some type of sensitive information is being provided by the remote party and/or the agent. For instance, in particular embodiments, the use of the SAS allows the contact center to determine if the remote party is providing sensitive information such as a credit card number or social security number so that a call recording can be appropriately tagged and the sensitive information can be masked within the recording. Generally, this is accomplished by the SAS monitoring for the presence of certain characteristics in the speech audio of the remote party and/or the agent.

In various embodiments, the SAS comprises a speech analytics module ("SAM") configured to detect certain speech characteristics (such as, for example, keywords spoken by the remote party or the agent). Upon detecting such speech characteristics, the SAM may generate "event notifications" that may indicate the characteristics detected or some type of context with respect to the characteristics. The event notifications are provided by the SAM to an event handler module ("EHM"), which in turn may provide the event notifications to an application specific module ("ASM"). In particular embodiments, an ASM is a software module configured for a particular application (hence, it is application specific). For instance, in particular cases, the ASM controls the process of "tagging" instances in a telephone call in which sensitive information is conveyed by a remote party and/or agent so that the sensitive information can be masked in a recording of the call.

General Process Flow

FIG. 1 illustrates an embodiment of a process flow for monitoring a call between a remote party and a contact center agent to detect the presence of speech characteristics in the speech audio of the remote party and/or the contact center agent that may indicate sensitive information is being conveyed. Depending on the embodiment, upon detecting sensitive information is being conveyed, information may be stored as metadata along with a recording of the telephone call so that the information can be used to mask the sensitive information in the recording. For instance, in particular embodiments when sensitive information is being conveyed, a timestamp is recorded when the sensitive information begins (starts) during the telephone call and a timestamp is recorded when the sensitive information ends during the telephone call. These timestamps are then stored as metadata along with the recording and an automated process may then be used in particular embodiments to access this metadata and mask the sensitive information in the recording of the telephone call.

The term "mask" can encompass several different techniques that can be used to conceal the sensitive information. For example, depending on the embodiment, the sensitive information may be skipped, purged, deleted, or removed from the recording, silence or an audio tone such as a "beep" may be placed over the sensitive information in the recording, or the audio data for sensitive information may be encrypted, suppress, or randomized in the recording. Those of ordinary skill in the art can envision other techniques that can be used to mask the sensitive information in the recording in light of this disclosure.

Turning now to FIG. 1, the process 100 begins with the contact center receiving a call from a remote party in Step 110. Depending on the contact center, the call may be received by one or more different call handler components within the contact center such as, for instance, an automatic call distributor ("ACDs"), interactive voice response system ("IVR"), dialer, predictive dialer, and/or private branch exchange ("PBXs"). In particular instances, the call handler component may inquire as to the reason the remote party has called the contact center so that the call can be routed to the appropriate personnel at the contact center. For instance, the call handler component may be an IVR that plays voice prompts to the remote party and collects and analyzes responses from the remote party in the form of dual-tone multiple frequency ("DMTF") tones and/or speech to identify the purpose of the call. Once the call handler component has identified the purpose of the call, the component then forwards the call to an appropriate agent to handle the call in Step 115. Accordingly, the remote party and the agent begin to converse on the call.

At this point, a speech analytics system ("SAS") begins to monitor the conversation being conducted between the remote party and the agent in Step 120. For instance, in particular embodiments, the SAS monitors the conversation to detect one or more speech characteristics in the audio of the remote party and/or the agent indicating that the remote party and/or agent may be conveying some type of sensitive information in Step 125. For example, the SAS may detect a characteristic such as the remote party speaking a particular word or phrase that may indicate the party is providing some type of sensitive information such as a credit card number or social security number. Specifically, the SAS may detect a digit is spoken by the remote party followed by fifteen or more digits indicating consecutive numbers spoken by the remote party in an instance where the remote party is providing a credit card number to make a payment on a purchase. In another instance, the SAS may detect a digit being spoken by the remote party followed by eight more digits in a cadence of three numbers, pause, two numbers, pause, and then four numbers indicating the remote party is providing a social security number. While in other instances, the SAS may be configured to identify the agent speaking a phrase such as "what is your credit card number?" followed by a series of digits or may identify occurrences of phrases being spoken that are specific to a particular situation or industry such as, for example, terms that are related to protected healthcare information. Accordingly, the SAS detects a start or end event of some type of sensitive information being conveyed by either the remote party or the agent.

Once detected, the SAS sets an indicator in Step 130. As is described in greater detail below, the SAS records metadata in particular embodiments that is stored along with a recording of the telephone call between the remote party and the agent to be used to identify occurrences of sensitive information within the recording so that such occurrences may be masked in the recording. Accordingly, the SAS sets an indicator identifying where the sensitive information takes place in the recording. For instance, in particular embodiments, the SAS may set an indicator such as, for example, a timestamp identifying where in the recording the sensitive information starts or ends and/or a memory value identifying the amount of memory used for the recording up to the start or the end of the sensitive information. Those of ordinary skill in the art can envision other indicators that may be used to identify occurrences of sensitive information in the recording in light of this disclosure.

In addition, the SAS may not only identify where occurrences of sensitive information take place but may also provide additional information along with the identified occurrences. For instance, in particular embodiments, the SAS may provide an indicator of the type of sensitive information being conveyed for an occurrence and/or a duration of an occurrence of sensitive information. For example, the type of sensitive information may identify an occurrence in which a party provided a social security number, credit card number, and/or personal medical information. In addition, the duration may identify the amount of time over which an occurrence of sensitive information took place or the amount of memory used in recording the sensitive information.

Further, in particular embodiments, the SAS may provide a confidence score indicating the SAS's "confidence" in properly identifying an occurrence when sensitive information is being conveyed by the remote party and/or agent. Thus in these particular embodiments, a confidence score provides a measure of the SAS's accuracy and reliability in properly identifying the occurrence of sensitive information being conveyed by the remote party and/or agent. Accordingly, in particular embodiments, an identifier is not set for sensitive information unless the confidence score is above a predetermined threshold value. Therefore, if the confidence score is above the threshold value, then the contact center can know with a degree of certainty that the SAS has properly identified an occurrence where sensitive information is being conveyed by the remote party and/or agent. If the confidence score is not above the threshold value, then the SAS does not set an indicator for the occurrence of sensitive information.

With that said, in particular embodiments, the contact center may establish a second value (e.g., a "QA report score") below the threshold value identifying occurrences in which a review by a person may be warranted to determine whether sensitive information was in fact conveyed during this time in the telephone call. Accordingly, for these embodiments, the SAS may set a different type of indicator to identify these occurrences. In turn, a person (such as a supervisor, for example) may manually review the recording of the telephone call to determine whether sensitive information was in fact conveyed during the time identified by the indicator. If so, then the person may take appropriate act to mask the sensitive information in the recording.

Generally speaking, the SAS may be configured to record different indicators and accompanying information for occurrences of sensitive information depending on the embodiment. For instance, in particular embodiments, the SAS may be configured to identify an occurrence of sensitive information and record a start or an end event for the occurrence along with a duration of the occurrence. For example, the SAS may detect a cadence of three numbers, pause, two numbers, pause, and then four numbers provided by the remote party during the telephone call indicating the remote party has provided his social security number and may record a timestamp indicating when the detection occurred along with a duration. In particular instances, the SAS may establish the duration based on the type of sensitive information that was conveyed. For example, if the SAS detected a social security number was given, then the SAS sets the duration to eight seconds. While if the SAS detected a credit card number was given, then the SAS sets the duration to twelve seconds.

In other embodiments, the SAS may be configured to identify both a start event and an end event for an occurrence of sensitive information and record the events accordingly. Such a configuration can allow for properly identifying a non-conventional occurrence of sensitive information that may not take place over a typical duration of time such as, for example, a remote party providing personal healthcare or medical information. Depending on the embodiment, both a start and end event may be required to identify an occurrence of sensitive information being conveyed. In addition, the start and end events may be required to be detected within a given timeframe of each other. Thus, in various embodiments, any arbitrary number of start and end events can be detected and tagged for a particular call. However, in particular embodiments, once a start event is identified, another start event is not met until a valid end event has been identified to close the tagging process for the individual occurrence of sensitive information. Such a configuration can help to avoid multiple overlapping occurrences.

Thus, for embodiments in which the SAS identifies both a start event and an end event for an occurrence of sensitive information, the SAS generally continues monitoring for an indication that the remote party and/or agent has finished providing the sensitive information during the telephone call once a start event has been detected. For example, the SAS may detect the end of a sequence of numbers. In some instances, the SAS may wait a period of time after the end of a sequence of numbers to determine whether one of the parties (e.g., the agent) is going to repeat the sensitive information back. In another example, the SAS may detect the end of specific words, phrases, or patterns previously defined as "start conditions" and/or may detect a certain word or phrase within a certain time period after detecting a start event.

At this point, the SAS determines whether the telephone call has ended between the remote party and the agent in Step 135. If not, then the SAS continues to monitor the telephone call for other occurrences of sensitive information. However, if the call has ended, then the SAS saves the identified occurrences of sensitive information as metadata along with the recording of the telephone call at Step 140. Accordingly, the indicators set for the occurrences define the boundaries for each occurrence of sensitive information provided during the telephone call. These boundaries may then be used to identify portions of the telephone call recording that need to be masked to conceal sensitive information that was conveyed during the telephone call.

Contact Center Architecture

Figure 2:
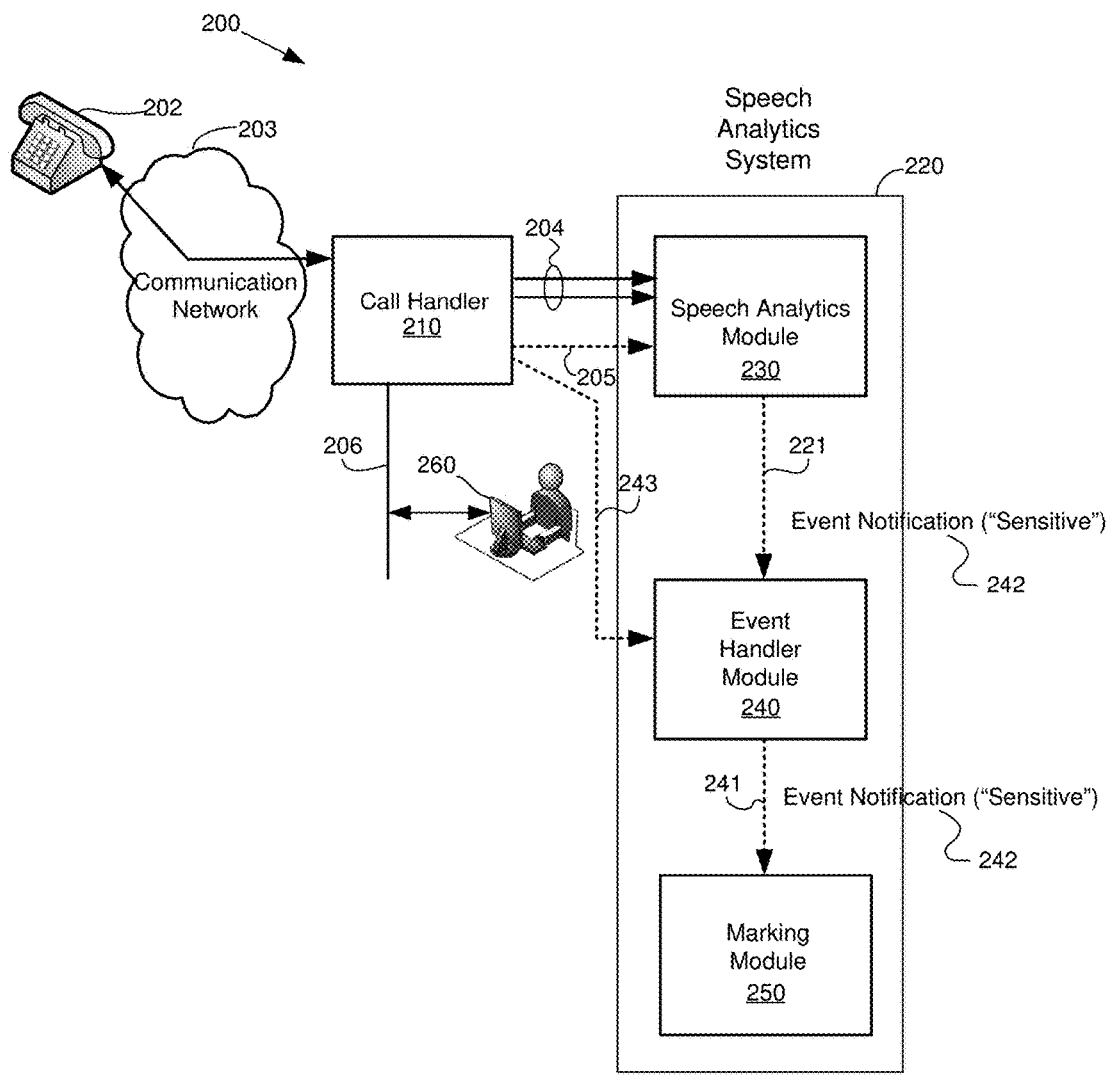
FIG. 2 illustrates an architecture of one embodiment of a contact center wherein a speech analytics system is used in accordance with various embodiments of the invention.

Turning now to FIG. 2, a high level architecture 200 of the relevant components involved in implementing embodiments of the invention is shown. The architecture 200 shows a remote party represented by a conventional telephone 202, although any number of devices and technologies may be used by the remote party. As previously mentioned, for purposes of illustration, and not for limitation, the examples herein focus on the contact center receiving a call from the remote party, although it should be readily apparent that the principles can equally apply to a call originated by the contact center to the remote party. Although the remote party is shown as using a conventional telephone and the communication network 203 is shown as a telephone network, other networks and communications technologies may be employed, such as Voice over IP ("VoIP"), cable networks, mobile networks, etc.

The remote party originates a call that is routed by the communication network 203 and received by a call handler 210. As previously mentioned, the call handler 210 may be one of any number of various devices used for processing calls in a contact center, including but not limited to: automatic call distributors ("ACDs"), interactive voice response systems ("IVRs"), dialers, predictive dialers, private branch exchanges ("PBXs"), etc. Accordingly, the call handler 210 connects the remote party with an agent. In particular instances, the agent may converse with the remote party using a workstation 260 that includes a voice device (i.e., phone), such as a headset, telephone, soft-phone etc. (not shown). Thus, depending on the circumstances, the voice device may be a so-called soft-phone integrated into the workstation 260 or a separate device. A local area network ("LAN") 206 may be used to transfer voice and data to the agent's workstation 260. Although, in other embodiments, separate facilities may be used for data transfer to the agent's workstation 260 and for voice communication with the agent's phone. The exact technology and configuration of the agent's workstation 260 is not relevant, as long as there is a voice connection between the agent and the remote party. There may be a number of other configurations involved with respect to connecting the remote party and the agent, but this does not alter the principles of the concepts disclosed herein.

Also shown in FIG. 2 is a speech analytics system ("SAS") 220. For the particular embodiment shown in FIG. 2, the SAS 220 comprises a speech analytics module ("SAM") 230, an event handler module ("EHM") 240, and an application specific module ("ASM"), more specifically a marking module 250. These modules 230, 240, 250 cooperate so as to monitor the remote party and the agent as they converse on the call to identify instances where sensitive information is conveyed by the remote party and/or the agent. In some instances, the remote party may provide sensitive information that is not intended to be heard by the agent. For instance, the remote party may be connected with a component in the architecture such as an IVR that receives sensitive information conveyed by the remote party. For example, the remote party may be connected with an IVR to provide his credit card information to make a purchase of a product over the phone. Therefore, the monitoring conducted by the modules 230, 240, 250 is not always necessarily the conversation being conducted between the remote party and the agent. Additional detail is provided below as to how these modules cooperate to accomplish the task of monitoring and identifying instances where sensitive information is conveyed during a telephone call.

Continuing on, in particular embodiments, each of these modules 230, 240, 250 may be a software module comprising a set of computer instructions that are executing in separate hardware processing systems or in a single common hardware system. While in other embodiments, other variations are possible. For instance, in particular embodiments, the SAM 230, the EHM 240, and/or the marking module 250 may be integrated into one module.

Further, in particular embodiments, one or more of the components may be offered as a service by a service provider or implemented in a premise-based solution for a contact center. For example, in particular embodiments, the call handler 210 may be offered as a premise-based or a hosted service (e.g., in the "cloud") that bridges on the SAS 220 that is also offered as a hosted service. Thus, the call handler 210 and the SAS 220 may be remotely located from each other and be operated and controlled by different entities. While in other embodiments, separate components of the SAS 220 may be offered as a service by a service provider. For instance, in one embodiment, a component performing the speech analytics (e.g., the SAM 230) may be provided through a service provider. Accordingly, to clarify the inventive concepts in this application, the description of various embodiments is based on describing various functions in terms of modules and their interaction with each other, recognizing that these modules may be deployed in various physical components at different locations.

In various embodiments, for the SAM 230 to monitor the speech audio of the remote party and/or agent, an audio leg (or "call leg") 204 is used. This may be accomplished by establishing a conference bridge that allows the SAM 230 to listen in on the remote party and the agent while they converse. For instance, in particular embodiments, a call leg 204 is established involving two separate Voice over IP ("VoIP") streams to the SAM 230. One of the streams conveys audio from the remote party and the other stream conveys audio from the agent. Thus, for these particular embodiments, the SAM 230 knows which audio stream is from which party, and thus speech and/or sounds detected on one of the streams can be readily associated with the appropriate party on the call. It is noted that use of the term "call leg" does not imply a particular form of technology. Nor does use of the term imply any particular physical structure of the call leg. The call leg may represent a virtual circuit, audio stream, link or other construct representing audio. Further, reference to a conference bridge does not imply any particular form of technology, e.g., an analog bridge, digital bridge, etc. Accordingly, depending on the embodiment, a call leg can be accomplished in a number of different ways, and again it is possible to use a number of different technologies.

A signaling link 205 between the call handler 210 and the SAM 230 provides the appropriate signaling information necessary to establish and terminate the call leg 204 and indicate the necessary information, including when a call is established and has ended between a remote party and an agent. However, in particular embodiments, a signaling link 243 may also exist between the call handler 210 and the EHM 240 and may be used to convey such signaling information instead of or in addition to the link 205 between the call handler 210 and the SAM 230. In FIG. 2, signaling or control data is generally shown as a dotted line and voice data is shown as a solid line. Use of the word "link" does not imply any particular logical or physical communication structure or protocol.

As mentioned above, the SAS 220 comprises the SAM 230, the EHM 240, and the marking module 250 that cooperate together to monitor the remote party and the agent as they converse on the call and to identify instances in which sensitive information is conveyed by the remote party and/or agent. A primary function of the SAM 230 is to monitor the words spoken and/or sounds made by the remote party and/or the agent while they converse on the call and to provide suitable event notifications to the EHM 240. That is to say, a primary function of the SAM 230 is to identify "audio contexts" in which event notifications are to be provided to the EHM 240. Thus, in various embodiments, the SAM 230 is typically configured to identify speech characteristics conveyed by the remote party and/or the agent while conversing on the call indicating some type of sensitive information is being conveyed by the remote party and/or the agent.

In various embodiments, the SAM 230 generates event notifications that are received by the EHM 240. Depending on the embodiment, these event notifications are generally messages that indicate information about a call involving a remote party and an agent or about speech characteristics detected for the call. An event notification message indicating information about the call is referred to as a "call-related event notification message" or simply a "call-related event notification." For instance, in particular embodiments, a call-related event notification may indicate activities such as the establishment or termination of a call or the transfer of a call to different party. An event notification message about speech characteristics detected for the call is referred to as a "speech-related event notification message" or simply a "speech-related event notification." Thus, a speech-related event notification generally indicates an audio context associated with the remote party and/or the agent as they converse on the call.

Accordingly, a speech-related event notification originates from the SAM 230 and is transmitted to the EHM 240 over a signaling link 221. For example, the remote party may provide his social security number while talking with the agent and the SAM 230 may report such an occurrence as a speech-related event notification to the EHM 240. In turn, the EHM 240 ensures that the correct ASM(s) receives the event notification. That is to say, there may be a variety of ASMs executing for various purposes and the EHM 240 ensures that the speech-related event notification related to the sensitive information conveyed by the remote party is forwarded to the correct ASM(s) (e.g., the marking module 250). The SAM 230 may do the same for call-related event notifications by transmitting such notifications over the signaling link 221. Furthermore, there may be multiple calls handled by a particular ASM at the same time. Accordingly, the EHM 240 may also ensure that the proper contextual information is provided to the ASM (such as, for example, a call identifier) so that the ASM can determine which call the speech-related event notification is related to.

At a high level, the purpose of the EHM 240 is to route event notifications to the appropriate ASM(s). There may be a number of different types of ASMs defined that require receiving event notifications. In one embodiment, the EHM 240 is configured to route a copy of each call-related event notification to each ASM and route a copy of each speech-related event notification to the appropriate ASM(s). This may involve routing each speech-related event notification to each ASM or selectively routing each speech-related event notification to only certain ASMs. For example, if there are multiple ASMs used for different purposes, then the EHM 240 ensures the proper ASMs receive the appropriate event notifications via a signaling link 241. Further information as to the reasoning and details of this operation can be found in the aforementioned patent applications that are incorporated by reference.

Therefore generally speaking, to recap, the EHM 240 receives event notifications that may be either call-related or speech-related. Call-related event notifications may be received from the SAM 230 over a signaling link 221 or from the call handler 210 over a signaling link 243. While speech-related event notifications are typically received from the SAM 230 over the signaling link 221. In turn, the EHM 240 informs the appropriate ASMs of the event notifications using the appropriate signaling link 241.

Accordingly, in particular embodiments, a remote party may place a call to the contact center and upon receiving the call, the contact center forwards the call to a call handler 210 such as an ACD and/or IVR. The call handler 210 (e.g., the IVR) interacts with the remote party over the call and gathers information as to why the remote party has called the contact center. Once the information has been gathered, the call handler 210 connects the remote party with an agent. At this point the remote party and the agent begin to converse.

Accordingly, the call handler 210 sends a call-related event notification over the signaling link 205 to the SAM 230 to notify the SAM 230 that the call has been received by the contact center and has been connected to an available agent. This event notification may include information that identifies the particular call (call identifier) and/or the agent that the call has been connected with so that the SAM 230 (and corresponding ASMs) can track the particular call. In addition, the call handler 210 establishes a call leg 204 between the SAM 230 and the call involving the remote party and the agent so that the SAM 230 can monitor the call while the remote party and agent converse.

At this point, the SAM 230 monitors the call to detect any speech characteristics from the audio of the remote party and/or the agent while on the call that may indicate sensitive information is being conveyed or is about to be conveyed by the remote party and/or the agent. For instance, in particular embodiments, the SAM 230 may monitor the call for any keywords that may indicate sensitive information is being conveyed by the remote party and/or the agent. For example, the SAM 230 may detect the remote party reciting a credit card number to the agent.

Upon detecting a speech characteristic indicating sensitive information is being conveyed, the SAM 230 sends a speech-related event notification 242 to the EHM 240 and the EHM 240 forwards the speech-related event notification 242 to the marking module 250. In response, the marking module 250 may carry out one or more actions as discussed in greater detail below. For instance, in one embodiment, the marking module 250 may record an indicator or a tag identifying the start or end point during the telephone call between the remote party and the agent at which time sensitive information is being conveyed.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Marking Module

Figure 3:
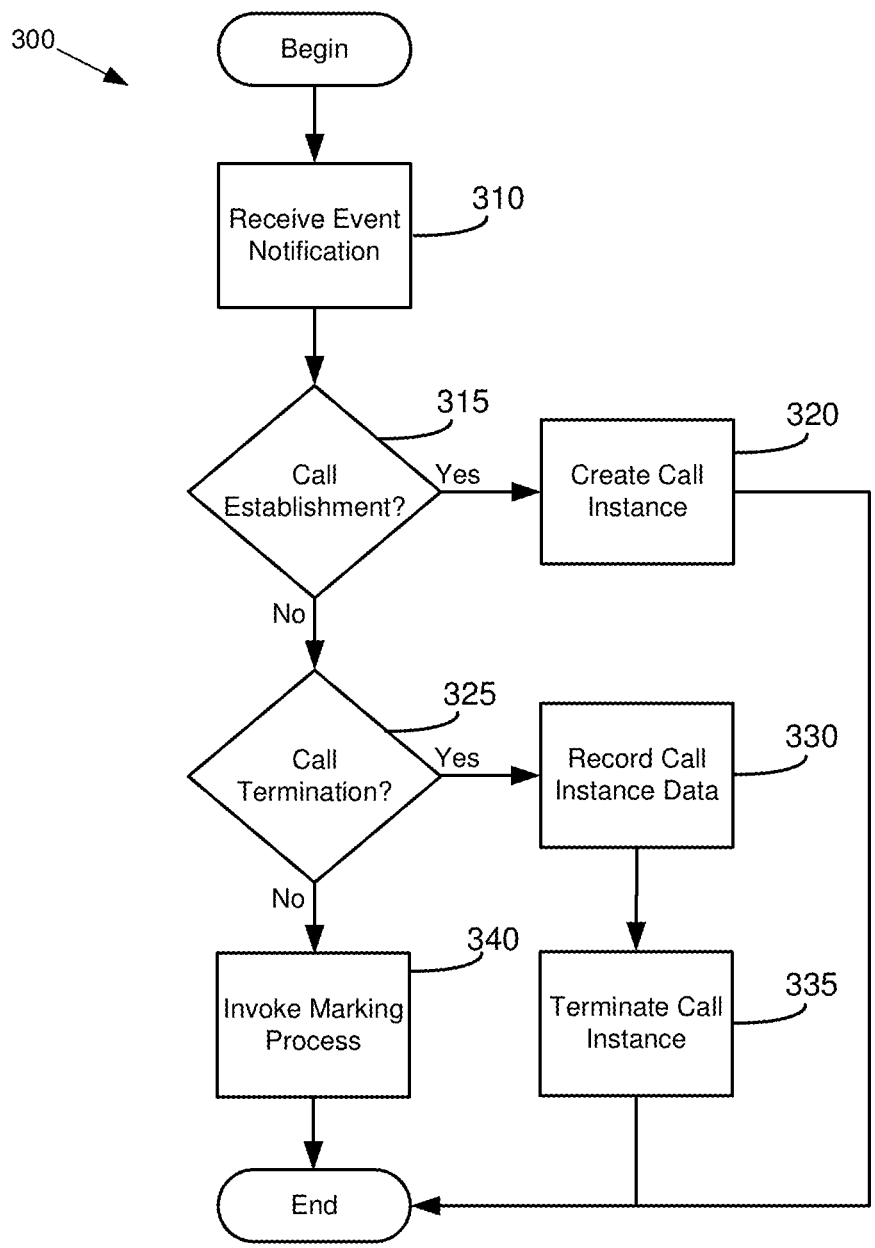
FIG. 3 illustrates a process flow that may be executed by a speech analytics system according to various embodiments of the invention.

Turning now to FIG. 3, additional details are provided regarding a process flow that may be executed by a speech analytics system 220 in detecting and identifying occurrences in which sensitive information is conveyed during a telephone call between a remote party and an agent in accordance with various embodiments of the invention. Specifically, FIG. 3 is a flow diagram showing a marking module 250 for performing such functionality according to various embodiments of the invention. For example, the flow diagram shown in FIG. 3 may correspond to operations carried out by a processor in a speech analytics system 220 located within the contact center as it executes the marking module 250 stored in the speech analytics system's volatile and/or nonvolatile memory.

The process flow shown in FIG. 3 describes how event notifications received by the marking module 250 are processed. The logic defined in this process flow operates on each call separately from other calls handled by the marking module 250. Recall that event notifications are received by the marking module 250 to inform the module 250 of various call-related and speech-related events associated with a call taking place between a remote party and an agent. For instance, event notifications are generated as a result of a call handler 210 processing a call received by the contact center in which the call handler 210 receives the call from a remote party and establishes a call leg so that the SAM 230 can monitor the call. In this respect, the processing is relatively simple in various embodiments, as the marking module 250 creates a call instance upon receiving a call-related event notification that a call has been received from a remote party and is being handled by an agent. In particular embodiments, this call instance is understood to be a data structure unique for the particular application (e.g., the marking module 250) that maintains data specific to a call. Accordingly, when a call is reported to the marking module 250 as being received and forwarded to an agent to handle, the marking module 250 generates a specific data structure (e.g., a call instance) that may then be modified when subsequent call-related and/or speech-related event notifications are received for that call. Further, when the call is reported as being terminated, depending on the embodiment, the marking module 250 may save, process, and/or delete the call instance for the call.

With this in mind, turning now to FIG. 3, the process 300 begins with the marking module 250 receiving an event notification in Operation 310. In turn, the marking module 250 determines whether the event notification is a call-related event notification in Operation 315, and more specifically whether the event notification is a call-related event notification that a call has been newly received, forwarded to an agent, and is being monitored. In particular embodiments, each event notification received by the marking module 250 includes some type of identifier for the particular call that the event notification corresponds to so that the marking module 250 can determine which call the event notification applies to. Thus, if the received event notification is a call-related event notification for a call that has been received and forwarded to an agent to handle, then the marking module 250 creates a call instance for the particular call in Operation 320. In particular embodiments, the creation of the call instance for the call results in generating a data structure stored in memory of the speech analytics system 220 or some other storage device within the contact center.

Returning to Operation 315, if instead the marking module 250 determines the event notification is not for a call that has been newly received, then the marking module 250 determines whether the event notification is a call-related event notification for a call that has been terminated in Operation 325. If so, then the marking module 250 records information associated with the call instance as metadata along with a recording of the telephone call in Operation 330. Accordingly, the metadata contains information (e.g., tags) indicating where (if any) occurrences of sensitive information were conveyed during the telephone call. In particular embodiments, if the call instance includes a start to an occurrence of sensitive information without an end to the occurrence, then the marking module may set an end to the occurrence at a predetermined time from when the occurrence began or to the end of the telephone call. In other embodiments, the marking module may identify the occurrence for manual review by an individual to identify the end of the occurrence. Furthermore, the marking module 250 terminates the call instance for the particular call in Operation 335.

However, if instead the marking module 250 determines in Operation 325 that the event notification is not a call-related event notification related to a call that has been terminated, then the marking module 250 has received a speech-related event notification for the call. Accordingly, the marking module 250 processes the speech-related event notification in Operation 340 according to the process flows shown in FIGS. 4 and 5.

Figure 4:
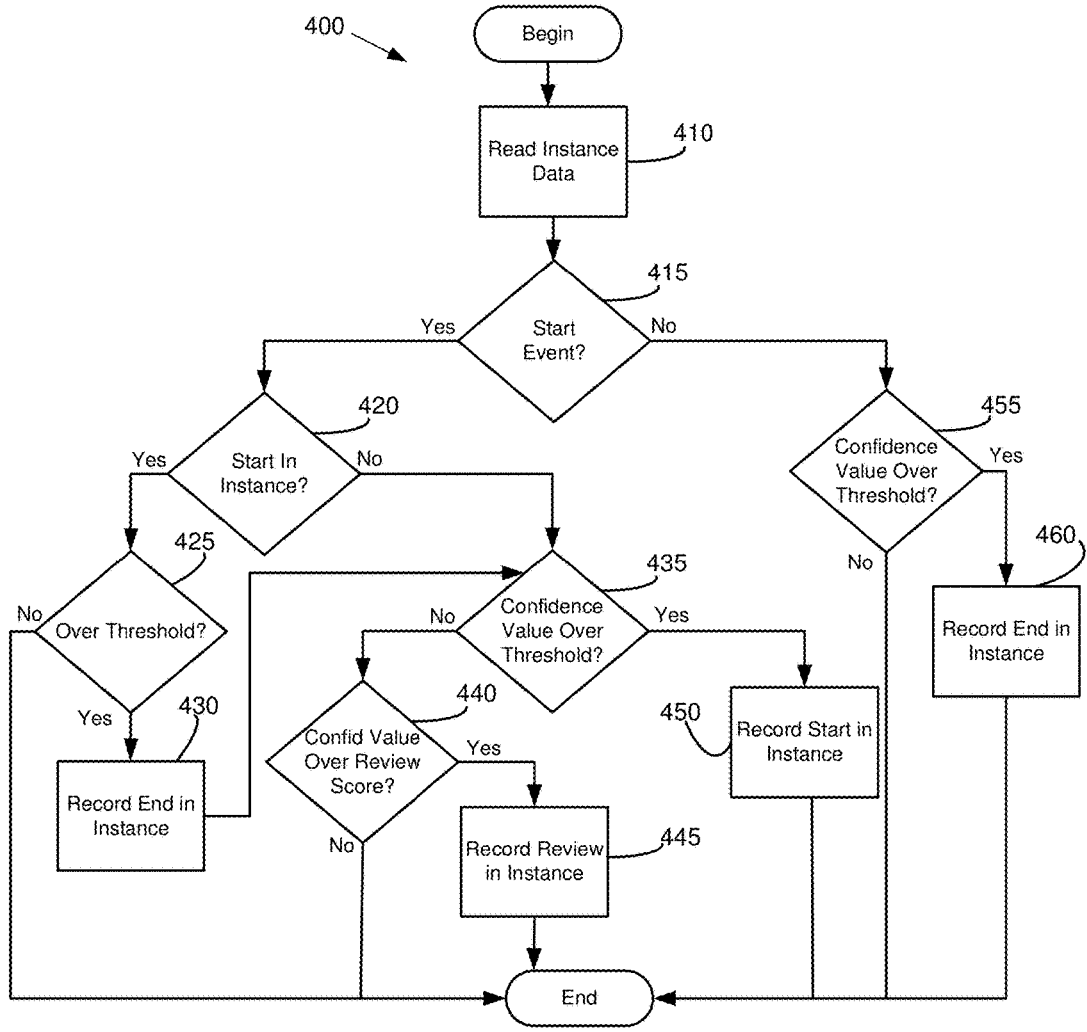
FIG. 4 illustrates a marking process flow that may be executed by a speech analytics system according to various embodiments of the invention.

Turning now to FIG. 4, the particular marking process 400 shown in FIG. 4 is for setting and recording start and end indicators (e.g., tags) for identifying an occurrence where sensitive information has been conveyed by the remote party and/or the agent during the telephone call. For example, a remote party on a particular call may be making a bill payment over the phone and may provide his credit card to the agent to use in making the payment. As a result, the SAM 230 detects the sequence of numbers provided by the remote party and generates two speech-related event notification messages (speech-related event notifications), one for a start event to identify the beginning of the occurrence and one for an end event to identify the ending of the occurrence, and sends the speech-related event notifications to the EHM 240. In turn, the EHM 240 forwards the notifications to the marking module 250. Accordingly, the marking module 250 receives the two speech-related event notifications separately and processes them accordingly. Therefore upon determining a received message is a speech-related event notification, the marking module 250 reads the instance data for the particular call associated with the speech-related event notification in Operation 410. Again, the speech-related event notification received by the marking module 250 includes an identifier used to identify the specific call and corresponding call instance associated with the notification.

Upon reading the instance data for the particular call, the marking module 250 determines whether the speech-related event notification is for a start event in Operation 415. Depending on the embodiment, the speech-related event notification may provide various information such as, for example, the notification type, event type, a confidence value, and/or a timestamp. The notification type generally identifies whether the speech-related event notification is for a start event or an end event. The event type generally identifies the type of sensitive information being conveyed. The confidence value provides an indication of the SAM's 230 accuracy and/or reliability in correctly detecting the start or end event. The timestamp provides the time during the telephone call at which the SAM 230 detected the event. Therefore, in Operation 415, the marking module 250 determine whether the speech-related event notification has been received for a start or end event based on the notification type.

If the notification type indicates the speech-related event notification is for a start event, then the marking module 250 determines whether the instance data for the telephone call includes a start event without an end event in Operation 420. That is to say, the marking module 250 determines whether the start event associated with the currently-received event notification has been received after receiving an event notification for a prior start event but before receiving an event notification for an end event for the prior start event. As previously mentioned, in particular embodiments, both a start event and an end event are generally required to properly identify an occurrence where sensitive information has been conveyed during the telephone call. Accordingly, in some of the embodiments, once a first start event has been received, a second, subsequent start event is not typically recorded in the call instance until a valid end event has been recorded for the first start event.

Therefore, returning to FIG. 4, if the marking module 250 determines the instance data currently has a start event previously recorded without a matching, valid end event, then the marking module 250 determines whether the difference between the timestamp received along with the current speech-related event notification and the timestamp associated with the first start event is greater than a threshold amount of time in Operation 425. If the difference is not greater than the threshold, then the marking module 250 simply ignores the event notification. However, if the difference is greater than the threshold, then the marking module 250 records an end event for the first start event in the instance for the call in Operation 430. Depending on the embodiment, the marking module 250 may record the end event for the first start event differently.

For instance, in one embodiment, the marking module 250 may record a timestamp along with the end event set at a predetermined amount of time after the first start event. For example, the contact center may establish the predetermined amount of time to be two minutes and the first start event may have a timestamp of three minutes and twenty-two seconds into the telephone call. Therefore, in this example, the marking module 250 would record a matching end event for the first start event with a timestamp of five minutes and twenty-two seconds into the telephone call. While in another embodiment, the marking module 250 may be configured to simply record a matching end event for the first start event with the same timestamp as recorded for this first start event. In this embodiment, the marking module 250 may then identify this end event as a place in the recording that should be manually reviewed by an individual to determine where the end of the sensitive information actually occurred during the telephone call.

At this point, the marking module 250 determines whether the confidence value received along with the current event notification is over a threshold value established by the contact center in Operation 435. If so, then the marking module 250 records the start event in the instance data for the telephone call in Operation 450. Thus, in particular embodiments, the marking module 250 records the timestamp along with a start event indicator (e.g., a tag) identifying the beginning of an occurrence where sensitive information has been conveyed during the telephone call.

However, if the confidence value is not over the threshold value, then the marking module 250 determines whether the confidence value is over a review score requirement in Operation 440. As previously mentioned, in particular embodiments, the contact center may establish a review score for situations in which the confidence score provided along with a start event does not meet the threshold value for recording the start event in the telephone call's instance but may still warrant review by an individual to determine whether the start event does in fact mark the beginning of an occurrence where sensitive information was conveyed during the telephone call. Therefore, if the confidence score provided along with the start event falls between the threshold value and the review score value, then the marking module 250 records an indicator in the instance for the call in Operation 445 identifying a place in the recording that should be reviewed by an individual to determine whether an occurrence where sensitive information was conveyed did or did not take place during the telephone call.

As a result of recording an indicator for a situation in which review by an individual is warranted, the individual may now locate where in the recording of the telephone call he or she should begin review to determine whether sensitive information was conveyed during that time or not and if so, when during the telephone call it was conveyed. For instance, once such an indicator has been recorded for a call in particular embodiments, the call may be encrypted upon completion and flagged for review by an authorized individual. In turn, the authorized individual may then access a graphical user interface ("GUI") to view a list or grid of calls that have been flagged for manual review and select the call. Accordingly, the authorized user may then decrypt and listen to the recording (e.g., audio file) for the call, forward to the portion(s) of the call with the indicator, and determine whether any sensitive information was conveyed during the portion(s) of the call. If so, then the authorized individual may manually add start and end events for the occurrence of sensitive information and/or may mask the occurrence in the recording.

Returning now to Operation 415, if the marking module 250 determines the speech-related event notification is not for a start event, then the marking module 250 determines whether the confidence value received with the event is over the threshold value in Operation 455. Generally speaking, since the event notification is not for a start event then the notification must be for an end event. Depending on the embodiment, the contact center can establish a different threshold value for end events with respect to the threshold value established for start events or can use the same value for both events. Regardless of how the contact center establishes the threshold value for end events, if the marking module 250 determines the confidence value received along with the speech-related event notification for the end event is over the threshold value, then the marking module 250 records the end event in the instance for the telephone call in Operation 460. Again, similar to a start event, the marking module 250 records the timestamp received along with the speech-related event notification in the instance to identify where during the telephone call the occurrence of sensitive information being conveyed by the remote party and/or the agent ended. At this point, the process 400 ends for the specific speech-related event notification.

It should be noted that depending on the embodiment, the marking module 250 may be configured to record an end event for an occurrence of sensitive information being conveyed during the telephone call differently depending on whether the call instance for the particular telephone call currently has a start event recorded with or without a matching, valid end event. For instance, in particular embodiments, if the call instance does have a start event without a matching, valid end event, then the marking module 250 records the end event as the matching, valid end event for the start event. However if the call instance does not have a start event without a matching, valid end event, then the marking module 250 replaces the matching, valid end event for the last start event in the call instance with the end event received with the current speech-related event notification. In other embodiments, the marking module 250 may simply record all of the valid end events received in which case the matching end event for any recorded start event is considered the last valid end event recorded in the call instance prior to a subsequent valid start event.

Figure 5:
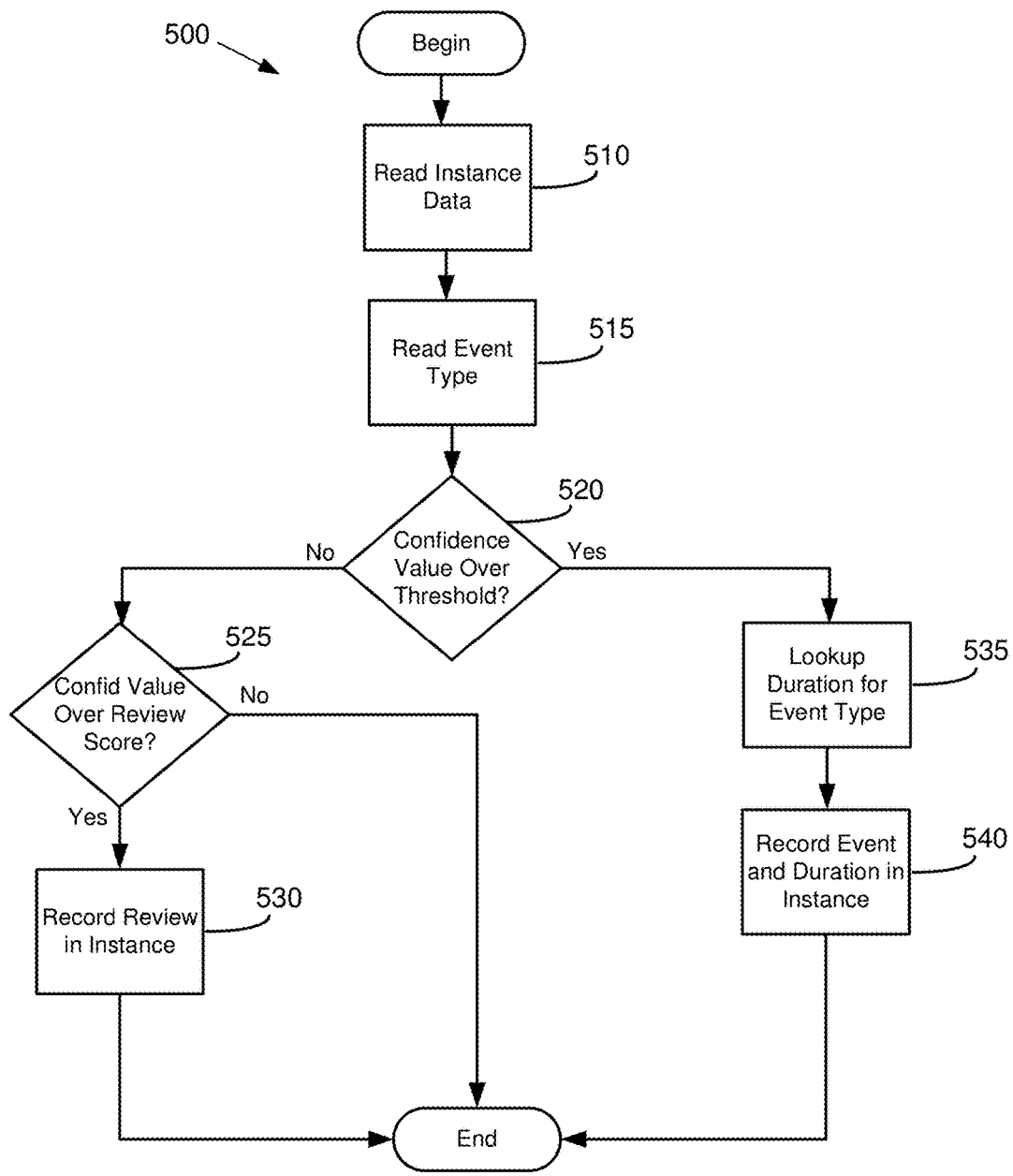
FIG. 5 illustrates a second marking process flow that may be executed by a speech analytics system according to various embodiments of the invention.

Turning now to FIG. 5, the particular marking process 500 shown in FIG. 5 is for setting and recording a start or an end indicator (e.g., tag) along with a duration for identifying an occurrence where sensitive information has been conveyed by the remote party and/or the agent during the telephone. In this instance, the SAM 230 detects the occurrence of sensitive information and generates a speech-related event notification message (speech-related event notification) and sends the notification to the EHM 240. In turn, the EHM 240 forwards the notification to the marking module 250. Accordingly, upon determining the received message is a speech-related event notification, the marking module 250 reads the instance data for the particular call associated with the speech-related event notification in Operation 510.

As previously mentioned, the speech-related event notification may provide various information such as the notification type, event type, a confidence value, and/or a timestamp along with the event notification. As mentioned, the event type generally identifies the type of sensitive information being conveyed and the confidence value provides an indication of the SAM's 230 accuracy and/or reliability in correctly detecting the event. Therefore upon reading the instance data for the particular call, the marking module 250 reads the event type in Operation 515.

At this point, the marking module 250 determines whether the confidence value received along with the event notification is over a threshold value established by the contact center in Operation 520. In particular embodiments, the contact center may establish or define different threshold values with respect to different types of sensitive information. For example, in one embodiment, the contact center may establish a first threshold value for occurrences involving parties providing their social security numbers and a second, different threshold value for occurrences involving parties providing their credit card numbers. Thus, in these particular embodiments, the marking module 250 may look up the applicable threshold value before determining whether the confidence value received along with the event notification is over the threshold value, although this operation is not shown in FIG. 5.

If the confidence value is over the threshold value, then the marking module 250 looks up the appropriate duration for the event type in Operation 535. Again, similar to the confidence value, the contact center in various embodiments may establish or define different durations for different types of sensitive information. Accordingly, in these embodiments, the contact center may store the different durations in some type of storage media that is accessed by the marking module 250. Therefore, upon retrieving the applicable duration, the marking module records the event and duration in the instance data for the telephone call in Operation 540.

However, if the confidence value is not over the threshold value, then the marking module 250 determines whether the confidence value is over a review score requirement in Operation 525. If the confidence score provided along with the event notification falls between the threshold value and the review score value, then the marking module 250 records an indicator in the instance for the call in Operation 530 identifying a place in the recording that should be reviewed by an individual to determine whether an occurrence where sensitive information was conveyed did or did not take place during the telephone call. As previously mentioned, as a result of recording an indicator for a situation in which review by an individual is warranted, the individual may now locate where in the recording of the telephone call he or she should begin review to determine whether sensitive information was conveyed during that time or not and if so, when during the telephone call it was conveyed.

Masking Module

Figure 6:
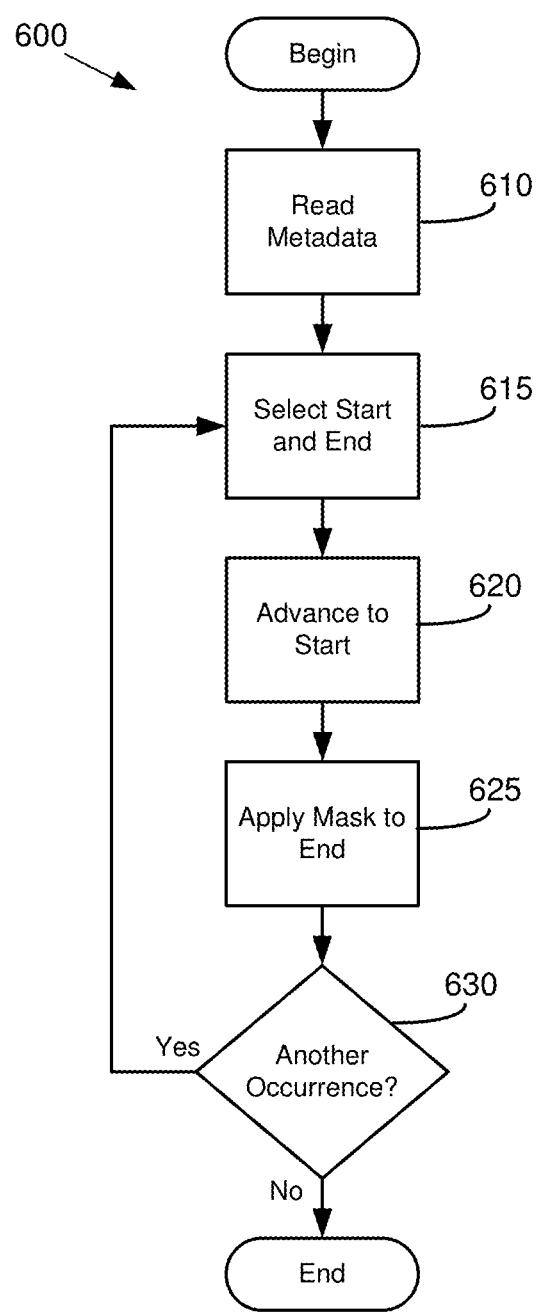
FIG. 6 illustrates a masking process flow that may be executed by a speech analytics system according to various embodiments of the invention.

Turning now to FIG. 6, additional details are provided regarding a process flow that may be executed by some component such as the speech analytics system 220 or other system within the contact center in masking occurrences in a recording for a telephone call where sensitive information was conveyed by a remote party and/or an agent in accordance with various embodiments of the invention. Specifically, FIG. 6 is a flow diagram showing a masking module for performing such functionality according to various embodiments of the invention. For example, the flow diagram shown in FIG. 6 may correspond to operations carried out by a processor in a system located within the contact center as it executes the masking module stored in the system's volatile and/or nonvolatile memory. For instance, depending on the contact center, the system may be the SAS 220 shown in FIG. 2 or some other standalone system that is not part of the SAS 220.

The process 600 begins with the masking module reading the metadata of the recording for the telephone call in Operation 610. As previously mentioned, the metadata includes information on the various occurrences during the telephone call where sensitive information was conveyed by the remote party and/or the agent. Specifically, in this particular instance, the metadata includes a start event representing a time (or memory position) where sensitive information began to be conveyed and an end event representing a time (or memory position) where the sensitive information ceased to be conveyed for each occurrence of sensitive information in the recording. For example, during a particular telephone call, the remote party may have provided the agent with a credit card number and expiration date to make a purchase over the phone. Accordingly, the remote party may have begun providing the credit card number at four minutes and twenty-seven seconds into the telephone call and may have finished providing the expiration date at four minutes and forty-four seconds into the telephone call. Therefore, the metadata provided along with the recording of the telephone call may include a start event of four minutes and twenty-seven seconds and a matching end event of four minutes and forty-four seconds.

Continuing on, the masking module selects the start event and the end event for the first occurrence where sensitive information was conveyed during the telephone call in Operation 615. The masking module then advances in the recording of the telephone call to the start of the occurrence where sensitive information was conveyed based on the selected start event in Operation 620. Thus, returning to the example, the masking module advances to the four minutes and twenty-seven seconds marker in the recording of the telephone call. At this point, the masking module applies some type of mask to the recording to the point where the occurrence of the sensitive information conveyed ended based on the selected end event in Operation 625. Therefore, in the example, the masking module applies the mask to the recording up to the four minutes and forty-four seconds mark of the recording.

The type of mask used by the masking module may be different depending on the embodiment. For instance, the masking module may overwrite the portion of the recording having the sensitive information with silence or an audio tone such as a "beep." In other instances, the masking module may suppress, randomize, or encrypt the audio data for the portion of the recording having the sensitive information. While in other instances, the masking module may delete, remove, or purge the portion of the recording having the sensitive information or may split the portion of the recording into a separate audio file that can be encrypted. In these instances, the encrypted files could be saved and made available for playback for authorized personnel. Those of ordinary skill in the art can envision other forms of masking or purging that can be used by the masking module in light of this disclosure.

Once the masking module has applied the mask to the recording for the occurrence where sensitive information was conveyed, the masking module determines whether the metadata has another occurrence recorded in Operation 630. If so, then the masking module returns to Operation 615 and selects the start event and the end event for the next occurrence where sensitive information was conveyed. The masking module then repeats the operations described above for masking the occurrence in the recording for the telephone call. Once the masking module has finished with each occurrence found in the metadata, the process 600 ends.

Figure 7:
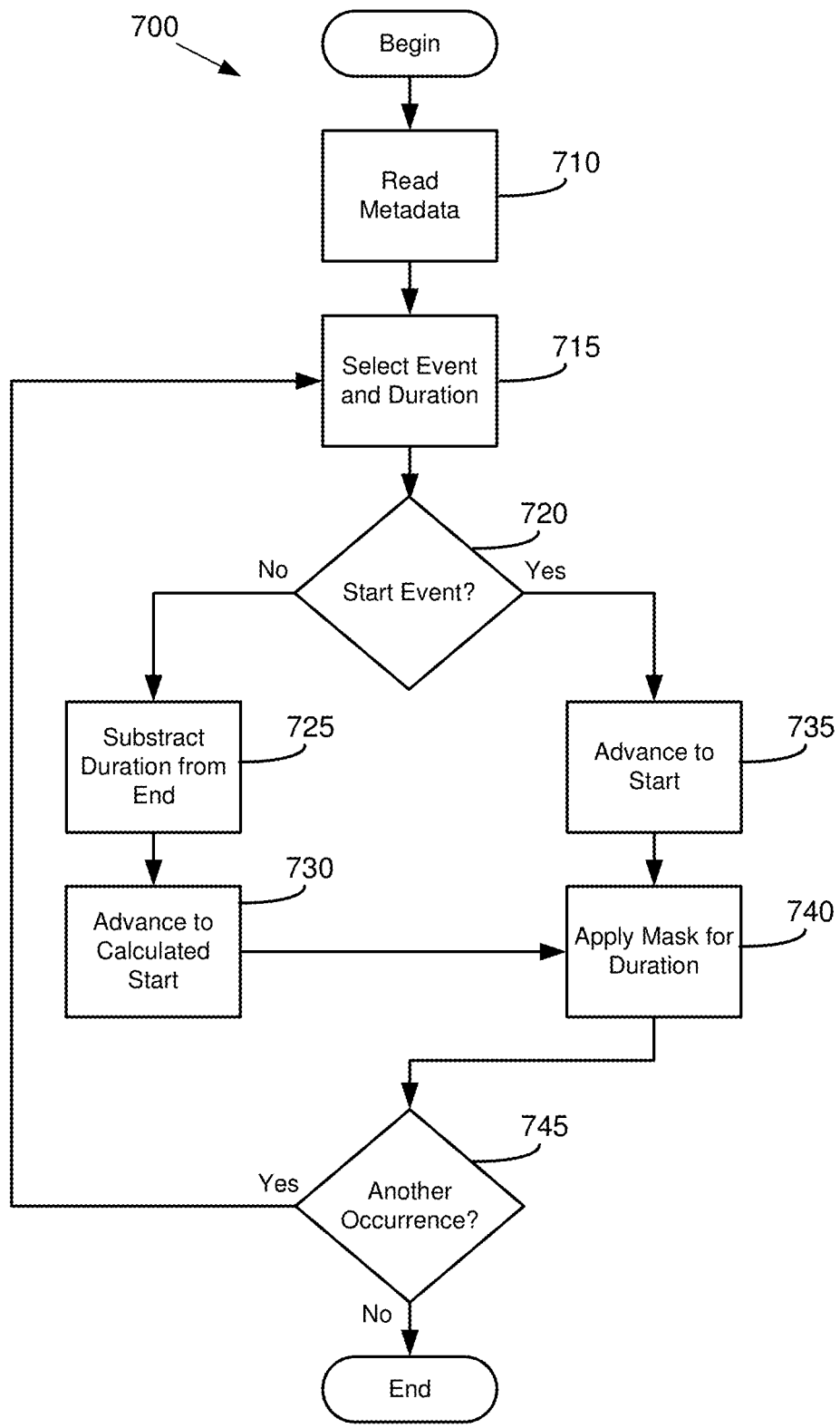
FIG. 7 illustrates a second masking process flow that may be executed by a speech analytics system according to various embodiments of the invention.

Turning now to FIG. 7, additional details are provided regarding another process flow that may be executed by some component such as the speech analytics system 220 or other system within the contact center in masking occurrences in a recording for a telephone call where sensitive information was conveyed by a remote party and/or an agent in accordance with various embodiments of the invention. However, in this particular instance, the metadata includes an event representing a time (or memory position) where sensitive information began to be conveyed or a time (or memory position) where the sensitive information ceased to be conveyed along with a duration representing the length of time (or amount of memory) the sensitive information was conveyed for each occurrence of sensitive information in the recording. For example, the remote party may have provided the agent with his social security number at seven minutes and twelve seconds into the telephone call and may have finished providing the number at seven minutes and seventeen seconds into the telephone call. Therefore, the metadata provided along with the recording of the telephone call may include a start event of seven minutes and twelve seconds and a duration of five seconds.

Accordingly, the process 700 begins with the masking module reading the metadata of the recording for the telephone call in Operation 710. The masking module then selects the event and duration for the first occurrence where sensitive information was conveyed during the telephone call in Operation 715. As mentioned, an event recorded in the metadata may indicate a start event representing a time (or memory position) where sensitive information began to be conveyed or an end event representing a time (or memory position) where the sensitive information ceased to be conveyed for each occurrence of sensitive information in the recording. Therefore, in Operation 720, the masking module determines whether the selected event is a start event. For example, in particular embodiments, the information included along with the event may include a notification type identifying the event as either a start event or an end event. Thus, returning to the example, since the event involving the occurrence where the remote party provided his social security number was the start where the party began to provide his social security number, the masking module determines the event is a start event.

At this point, the masking module advances in the recording of the telephone call to the start of the occurrence where the sensitive information was conveyed based on the selected start event in Operation 735. Thus, returning to the example, the masking module advances to the seven minutes and twelve seconds marker in the recording of the telephone call. Accordingly, the masking module applies some type of mask to the recording for the duration of the occurrence where the sensitive information was conveyed in Operation 740. Therefore, in the example, the masking module applies the mask to the recording for five seconds to the seven minutes and seventeen seconds mark of the recording.

Returning now to Operation 720, if instead the masking module determines the event is not a start event (that is to say, the masking module determines the event is an end event), then the masking module subtracts the duration from the time for the end event in Operation 725. Once the duration is subtracted, the masking module then advances in the recording of the telephone call to the calculated start of the occurrence in Operation 730 and applies some type of mask to the recording for the duration of the occurrence in Operation 740

Once the masking module has applied the mask to the recording for the occurrence where sensitive information was conveyed, the masking module determines whether the metadata has another occurrence recorded in Operation 745. If so, then the masking module returns to Operation 715 and selects the event and duration for the next occurrence where sensitive information was conveyed. The masking module then repeats the operations described above for masking the occurrence in the recording for the telephone call. Once the masking module has finished with each occurrence found in the metadata, the process 700 ends. As a result of the process 600 shown in FIG. 6 or the process 700 shown in FIG. 7, the recording of the telephone call has now been "cleansed" so that anyone who listens to the recording is not able to comprehend any sensitive information that was conveyed by the remote party and/or the agent during the telephone call.

Audio Playback Module

In many instances, it is desirable to cleanse all sensitive information permanently from a recording so that there is no risk of such information being exposed to a wrong party. Accordingly, in various embodiments, a contact center may use a masking process such as one of the processes described above in FIGS. 6 and 7 to permanently cleanse the sensitive information from a recording. As a result, any party (whether authorized or not authorized) listening to the recording using a conventional audio playback module such as, for example, Microsoft's® Windows® Media Player or Apple's® QuickTime® will not be able to comprehend the sensitive information.

However, in other instances, it may be desirable to cleanse the sensitive information in a non-destructive manner so that the sensitive information may be recovered and listened to, if desired, by authorized personnel. As previously mentioned, one way to achieve this capability is to remove the occurrences of sensitive information from a recording and encrypt them so that they can be later decrypted and listened to if desired. However, another method to achieve this capability involves the use of an audio playback module that is configured to mask the occurrences of sensitive information in a recording while allowing an "unauthorized" party to listen to the remainder of the recording.

Figure 8:
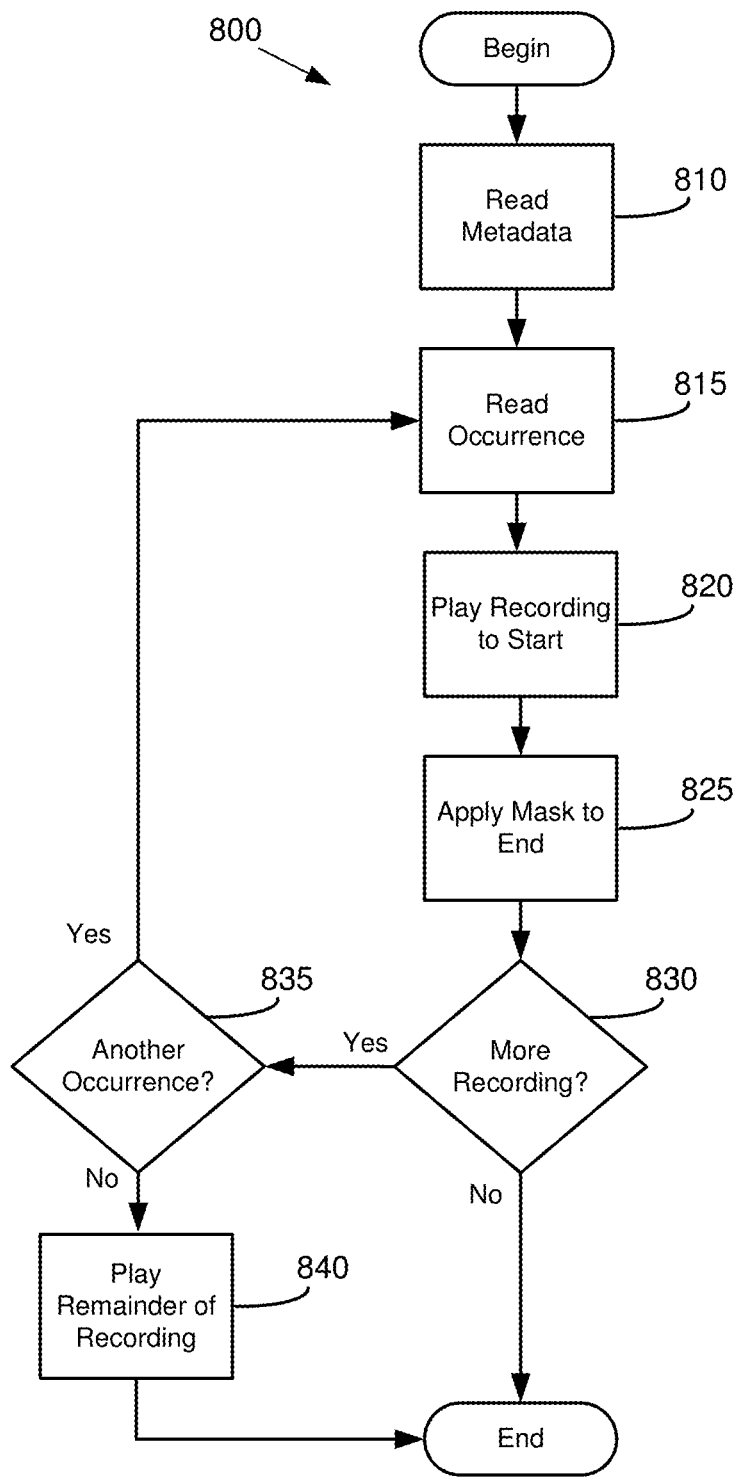
FIG. 8 illustrates an audio playback process flow that may be executed by a playback system according to various embodiments of the invention

Therefore, turning now to FIG. 8, details are provided regarding a process flow that may be executed by some component within the contact center to mask occurrences of sensitive information in a recording while allowing a party to listen to the remainder of the recording in accordance with various embodiments of the invention. Specifically, FIG. 8 is a flow diagram showing an audio playback module for performing such functionality according to various embodiments of the invention. For example, the flow diagram shown in FIG. 8 may correspond to operations carried out by a processor in a system located within the contact center such as the SAS 220 an agent's workstation as it executes the audio playback module stored in the system's volatile and/or nonvolatile memory.

The process 800 begins with the audio playback module reading the metadata of the recording of a telephone call in Operation 810. As previously mentioned, the metadata includes information on the various occurrences during the telephone call where sensitive information was conveyed by the remote party and/or the agent. However, depending on the embodiment, the metadata may include different types of information. For instance, in particular embodiments, the metadata may include a start event representing a time (or memory position) where sensitive information began to be conveyed and an end event representing a time (or memory position) where the sensitive information ceased to be conveyed for each occurrence of sensitive information in the recording. While in other embodiments, the metadata may include an event representing a time (or memory position) where sensitive information began to be conveyed or a time (or memory position) where the sensitive information ceased to be conveyed along with a duration representing the length of time (or amount of memory) the sensitive information was conveyed for each occurrence of sensitive information in the recording. For the process 800 shown in FIG. 8, the metadata includes a start event and an end event for each occurrence of sensitive information.

Therefore, the audio playback module reads the information for the first occurrence of sensitive information in Operation 815. Once the audio playback module has read the information for the occurrence, the audio playback modules plays the recording to the start event for the occurrence in Operation 820. Accordingly, the party listening to the recording hears the audio for the recording up to the start of the occurrence of sensitive information.

At this point, the audio playback module masks the occurrence of sensitive information to the end of the occurrence in Operation 825. For example, the audio playback module can simply skip ahead in the recording to where the occurrence of sensitive information ends. While in other instances, the audio playback module may add silence or an audio tone over the portion of the recording having the sensitive information so that the information cannot be understood. Still in other instances, the audio playback module may suppress, randomize, or encrypt the portion of the recording having sensitive information that so it cannot be understood. Those of ordinary skill in the art can envision other techniques that can be used in masking the occurrence of sensitive information in light of this disclosure. However, generally speaking, the technique used in various embodiments does not alter the recording so that the occurrence of sensitive information is permanently removed.

Once the occurrence of sensitive information has been masked, the audio playback module determines whether more of the recording remains to be played in Operation 830. If more of the recording remains, then the audio playback module determines from the metadata whether there is another occurrence of sensitive information in the remainder of the recording in Operation 835. If so, then the audio playback module returns to Operation 815 and repeats the operations described above for the next occurrence of sensitive information. If not, then the audio playback module plays the remainder of the recording in Operation 840.

Exemplary Computer Processing Device

Figure 9:
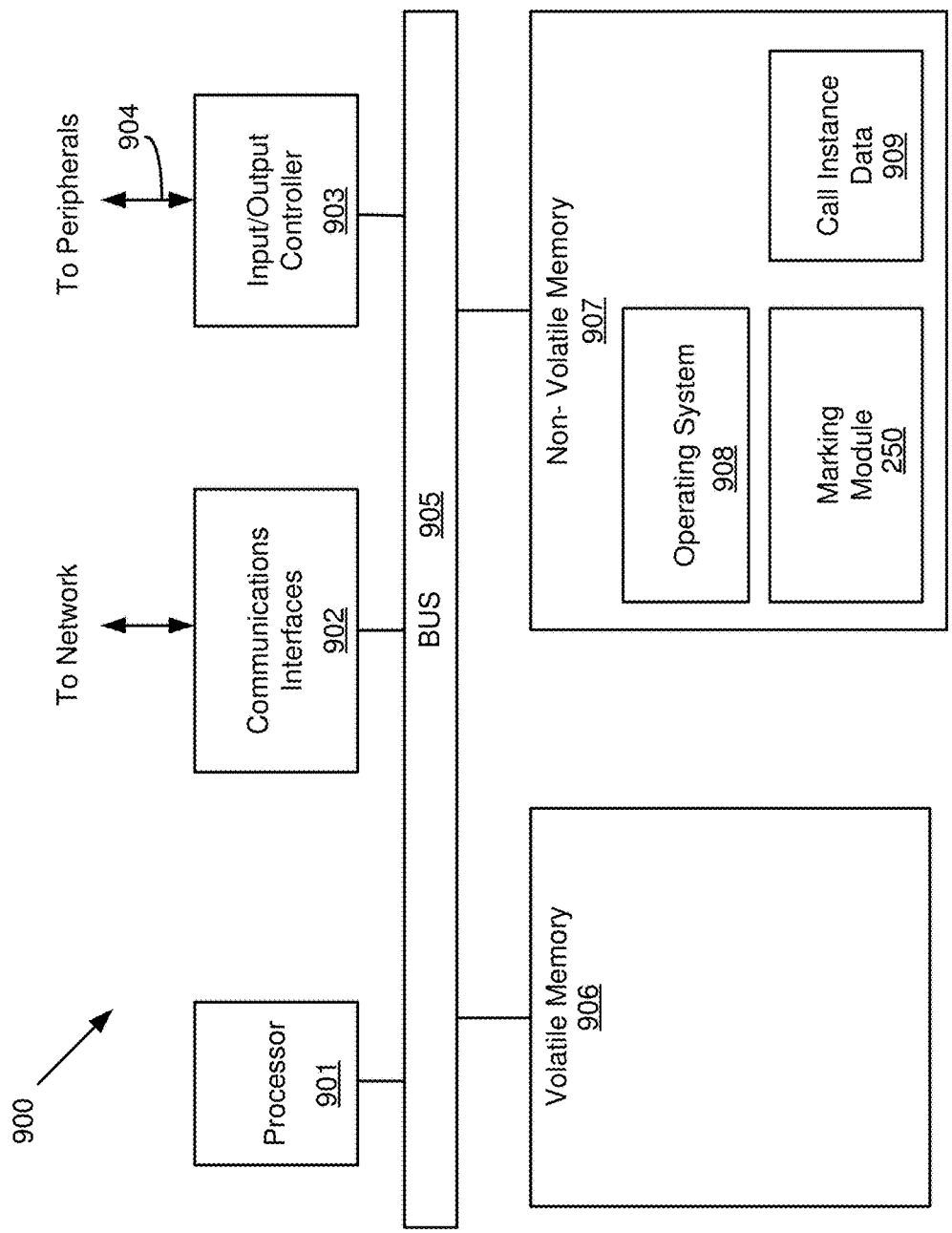
FIG. 9 illustrates an embodiment of a processing device for practicing various technologies and concepts disclosed herein.

FIG. 9 is an exemplary schematic diagram of a computer processing system 900 that may be used in embodiments to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. The system 900 may apply to one or more components (such as a call handler 210, SAS 220, masking component, audio playback component, and/or agent workstation) executing any of the above-mentioned modules such as, for instance, the call handler module, the SAM 230, the EHM 240, the marking module 250, the masking module, and/or the audio playback module, although only the marking module 250 is shown in FIG. 9.

As shown in FIG. 9, the processing system 900 may include one or more processors 901 that may communicate with other elements within the processing system 900 via a bus 905. The processor 901 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In particular embodiments, the processing system 900 may include one or more communications interfaces 902 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 903 may also communicate with one or more input devices or peripherals using an interface 904 such as, but not limited to: a keyboard, a mouse, a touch screen/display input, microphone, pointing device, etc. The input/output controller 903 may also communicate with output devices or peripherals, such as displays, printers, speakers, headsets, banner displays, etc. These may be used, in part, to receive administrator input, such as for configuring the system's operation.

The processor 901 may be configured to execute instructions stored in volatile memory 906, non-volatile memory 907, or other forms of computer-readable storage media accessible to the processor 901. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store various program code modules and data, which also may be loaded into the volatile memory 906 at execution time (though not shown as such in FIG. 9). For example, the non-volatile memory 907 may store one or more modules such as the marking module 250 that implement and perform the above-mentioned process flows containing instructions for performing the processes and/or functions associated with the technologies disclosed herein, as well as operating system code 908. These modules may also manage data, such as call instance data 909 for example that is used for tracking various calls. The data and/or modules in the non-volatile memory 907 may be copied in the volatile memory 906 at run time. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901 and may form a part of, or may interact with, the modules.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not encompass a transitory, propagating signal, photon-based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for identifying an occurrence during a conversation being conducted between a first party and a second party where sensitive information is conveyed by at least one of the first party and the second party, the system comprising:
a speech analytics component configured to:
monitor audio of the conversation for at least one of the first party and the second party;
detect a first speech characteristic in the audio of the conversation for at least one of the first party and the second party indicating a start event identifying a start of the occurrence where the sensitive information is conveyed by at least one of the first party and the second party;
detect a second speech characteristic in the audio of the conversation for at least one of the first party and the second party indicating an end event identifying an end of the occurrence where the sensitive information is conveyed by at least one of the first party and the second party;
record a first identifier for the start event and a second identifier for the end event as metadata along with a recording of the audio of the conversation for at least one of the first party and the second party to identify where in the recording the occurrence takes place;
detect a third speech characteristic in the audio of the conversation for at least one of the first party and the second party indicating a second start event identifying a start of a second occurrence where sensitive information is conveyed by at least one of the first party and the second party; and
based on a confidence score associated with detecting the third speech characteristic being less than a threshold value and greater than a review score, mark the recording of the audio for review beginning at the second start event; and
an audio playback component configured to:
read the first identifier and the second identifier from the metadata;
play the recording of the audio for an individual to the start event based on the first identifier;
after playing the recording of the audio to the start event, apply a mask to the recording of the audio from the start event to the end event based on the second identifier without altering the recording so that the occurrence of sensitive information is permanently removed and so that the individual listening to the recording of the audio is unable to comprehend the sensitive information conveyed during the occurrence; and
after applying the mask to the recording of the audio from the start event to the end event, play the recording of the audio for the individual from the end event to an end of the recording of the audio.

2. The system of claim 1, wherein the speech analytics component is configured to detect the first speech characteristic in the audio of the conversation for at least one of the first party and the second party based on a confidence score associated with detecting the first speech characteristic being greater than a threshold value.

3. The system of claim 1, wherein the conversation comprises a telephone call, the first party comprises an agent at a contact center, and the second party comprises a party remote from the contact center.

4. A non-transitory, computer-readable medium comprising computer-executable instructions for identifying an occurrence during a conversation being conducted between a first party and a second party where sensitive information is conveyed by at least one of the first party and the second party, the computer-executable instructions, when executed by at least one computer processor, cause the at least one computer processor to:
monitor audio of the conversation for at least one of the first party and the second party;
detect a first speech characteristic in the audio of the conversation for at least one of the first party and the second party indicating a start event identifying a start of the occurrence where the sensitive information is conveyed by at least one of the first party and the second party;
detect a second speech characteristic in the audio of the conversation for at least one of the first party and the second party indicating an end event identifying an end of the occurrence where the sensitive information is conveyed by at least one of the first party and the second party;
record a first identifier for the start event and a second identifier for the end event as metadata along with a recording of the audio of the conversation for at least one of the first party and the second party to identify where in the recording the occurrence takes place;
detect a third speech characteristic in the audio of the conversation for at least one of the first party and the second party indicating a second start event identifying a start of a second occurrence where sensitive information is conveyed by at least one of the first party and the second party;
based on a confidence score associated with detecting the third speech characteristic being less than a threshold value and greater than a review score, mark the recording of the audio for review beginning at the second start event;
read the first identifier and the second identifier from the metadata;
play the recording of the audio for an individual to the start event based on the first identifier;
after playing the recording of the audio to the start event, apply a mask to the recording of the audio from the start event to the end event based on the second identifier without altering the recording so that the occurrence of sensitive information is permanently removed and so that the individual listening to the recording of the audio is unable to comprehend the sensitive information conveyed during the occurrence; and after applying the mask to the recording of the audio from the start event to the end event, play the recording of the audio for the individual from the end event to an end of the recording of the audio.

5. The non-transitory, computer-readable medium of claim 4, wherein the computer-executable instructions, when executed by the at least one computer processor, cause the at least one computer processor to detect the first speech characteristic in the audio of the conversation for at least one of the first party and the second party based on a confidence score associated with detecting the first speech characteristic being greater than a threshold value.

6. The non-transitory, computer-readable medium of claim 4, wherein the conversation comprises a telephone call, the first party comprises an agent at a contact center, and the second party comprises a party remote from the contact center.

7. A method for identifying an occurrence during a conversation being conducted between a first party and a second party where sensitive information is conveyed by at least one of the first party and the second party, the method comprising the steps of:
monitoring audio of the conversation for at least one of the first party and the second party by a speech analytics system;
detecting a first speech characteristic in the audio of the conversation for at least one of the first party and the second party by the speech analytics system, the first speech characteristic indicating a start event identifying a start of the occurrence where the sensitive information is conveyed by at least one of the first party and the second party;
detecting a second speech characteristic in the audio of the conversation for at least one of the first party and the second party by the speech analytics system, the second speech characteristic indicating an end event identifying an end of the occurrence where the sensitive information is conveyed by at least one of the first party and the second party;
recording a first identifier for the start event and a second identifier for the end event by the speech analytics system as metadata along with a recording of the audio of the conversation for at least one of the first party and the second party to identify where in the recording the occurrence takes place;
detecting a third speech characteristic in the audio of the conversation for at least one of the first party and the second party by the speech analytics system, the third speech characteristic indicating a second start event identifying a start of a second occurrence where sensitive information is conveyed by at least one of the first party and the second party; and
based on a confidence score associated with detecting the third speech characteristic being less than a threshold value and greater than a review score, marking the recording of the audio for review beginning at the second start event by the speech analytics system;
reading the first identifier and the second identifier from the metadata by an audio playback system;
playing the recording of the audio for an individual to the start event based on the first identifier by the audio playback system;
after playing the recording of the audio to the start event, applying a mask to the recording of the audio from the start event to the end event based on the second identifier by the audio playback system without altering the recording so that the occurrence of sensitive information is permanently removed and so that the individual listening to the recording of the audio is unable to comprehend the sensitive information conveyed during the occurrence; and
after applying the mask to the recording of the audio from the start event to the end event, playing the recording of the audio for the individual from the end event to an end of the recording of the audio by the audio playback system.

8. The method of claim 7, wherein the step of detecting the first speech characteristic in the audio of the conversation for at least one of the first party and the second party is carried out by the speech analytics system based on a confidence score associated with detecting the first speech characteristic being greater than a threshold value.

9. The method of claim 7, wherein the conversation comprises a telephone call, the first party comprises an agent at a contact center, and the second party comprises a party remote from the contact center.

* * * * *